United States Patent
Govindan Nair et al.

(10) Patent No.: US 11,368,394 B2
(45) Date of Patent: Jun. 21, 2022

(54) USING LABELS IN A VIRTUALIZED DEVICE ENVIRONMENT

(71) Applicant: HEWLETT PACKARD ENTERPRISE DEVELOPMENT LP, Houston, TX (US)

(72) Inventors: Anoop Govindan Nair, Bangalore (IN); Vijeesh Erankotte Panayamthatta, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 16/807,598

(22) Filed: Mar. 3, 2020

(65) Prior Publication Data

US 2020/0344160 A1      Oct. 29, 2020

(30) Foreign Application Priority Data

Apr. 26, 2019   (IN) .......................... IN201941016788

(51) Int. Cl.
*H04L 45/50* (2022.01)
*H04L 45/24* (2022.01)
(Continued)

(52) U.S. Cl.
CPC .......... *H04L 45/50* (2013.01); *H04L 41/0668* (2013.01); *H04L 45/22* (2013.01);
(Continued)

(58) Field of Classification Search
None
See application file for complete search history.

(56) References Cited

U.S. PATENT DOCUMENTS 6,055,561 A    4/2000  Feldman et al.
9,912,577 B2   3/2018  Filsfils et al.
(Continued)

OTHER PUBLICATIONS

Check Point VSX, (Web Page), Version NGX R60, Retrieved Apr. 11, 2019, 208 Pgs.
(Continued)

*Primary Examiner* — Gregory B Sefcheck
*Assistant Examiner* — Suk Jin Kang
(74) *Attorney, Agent, or Firm* — Hewlett Packard Enterprise Patent Department

(57) ABSTRACT

Examples disclosed herein relate to a method comprising receiving, at a first label manager of a first network device, a first request to allocate a first label for a first route prefix for a first protocol, wherein the first network device and a second network device are part of a virtualized network device. The method includes receiving, at a second label manager of the second network device, a second request to determine the first label for the first route prefix for the first protocol, wherein the second request originates from the first label manager and determining, at the second label manager, the first label for the first route prefix for the first protocol. The method includes transmitting, the first label to the first label manager and transmitting, by the first label manager, the first label to a label management protocol corresponding to the first protocol, in response to the first request.

17 Claims, 5 Drawing Sheets

(51) Int. Cl.
*H04L 45/74* (2022.01)
*H04L 49/00* (2022.01)
*H04L 41/0668* (2022.01)
*H04L 45/00* (2022.01)

(52) U.S. Cl.
CPC ............ *H04L 45/245* (2013.01); *H04L 45/74* (2013.01); *H04L 49/70* (2013.01)

(56) References Cited

U.S. PATENT DOCUMENTS

| | | | | |
|---|---|---|---|---|
| 2009/0103538 | A1* | 4/2009 | Yoshimi | H04L 12/66 370/392 |
| 2011/0142046 | A1* | 6/2011 | Guichard | H04L 45/50 370/392 |
| 2012/0236730 | A1* | 9/2012 | Zhou | H04L 45/68 370/244 |
| 2013/0336315 | A1* | 12/2013 | Guichard | H04L 45/50 370/389 |
| 2014/0215010 | A1 | 7/2014 | Liang et al. | |
| 2016/0014021 | A1* | 1/2016 | Li | H04L 45/50 370/389 |
| 2016/0119229 | A1* | 4/2016 | Zhou | H04L 12/4641 370/392 |
| 2016/0182362 | A1* | 6/2016 | Ernstrom | H04L 45/22 370/217 |
| 2018/0026880 | A1* | 1/2018 | Nainar | H04L 45/26 370/389 |
| 2018/0351857 | A1* | 12/2018 | Vairavakkalai | H04L 63/0272 |
| 2018/0351862 | A1* | 12/2018 | Jeganathan | H04L 45/745 |
| 2018/0351863 | A1* | 12/2018 | Vairavakkalai | H04L 45/02 |
| 2018/0351864 | A1* | 12/2018 | Jeganathan | H04L 45/586 |
| 2018/0351882 | A1* | 12/2018 | Jeganathan | H04L 45/50 |
| 2019/0058657 | A1* | 2/2019 | Chunduri | H04L 45/12 |
| 2019/0075045 | A1* | 3/2019 | Hassan | H04L 45/28 |
| 2019/0158393 | A1* | 5/2019 | Nainar | H03M 13/47 |
| 2019/0222496 | A1* | 7/2019 | Dorai | H04L 41/0213 |
| 2019/0334814 | A1* | 10/2019 | Peng | H04L 45/22 |
| 2019/0363975 | A1* | 11/2019 | Djernaes | H04L 45/24 |
| 2020/0153733 | A1* | 5/2020 | Chunduri | H04L 45/38 |
| 2020/0322183 | A1* | 10/2020 | Lin | H04L 45/66 |
| 2020/0358698 | A1* | 11/2020 | Song | H04L 69/22 |
| 2021/0203599 | A1* | 7/2021 | Guichard | H04L 45/50 |

OTHER PUBLICATIONS

Odom, W. et al., Multiprotocol Label Switching, (Research Paper), Jun. 25, 2008, 9 Pgs.

* cited by examiner

US 11,368,394 B2

USING LABELS IN A VIRTUALIZED DEVICE ENVIRONMENT

BACKGROUND

Multiprotocol Label Switching (MPLS) is a networking technique where data is directed from one node to the next based on short path labels instead of traditional network addresses.

BRIEF DESCRIPTION OF THE DRAWINGS

Some implementations of the present disclosure are described with respect to the following figures.

DETAILED DESCRIPTION

Figure 1A:
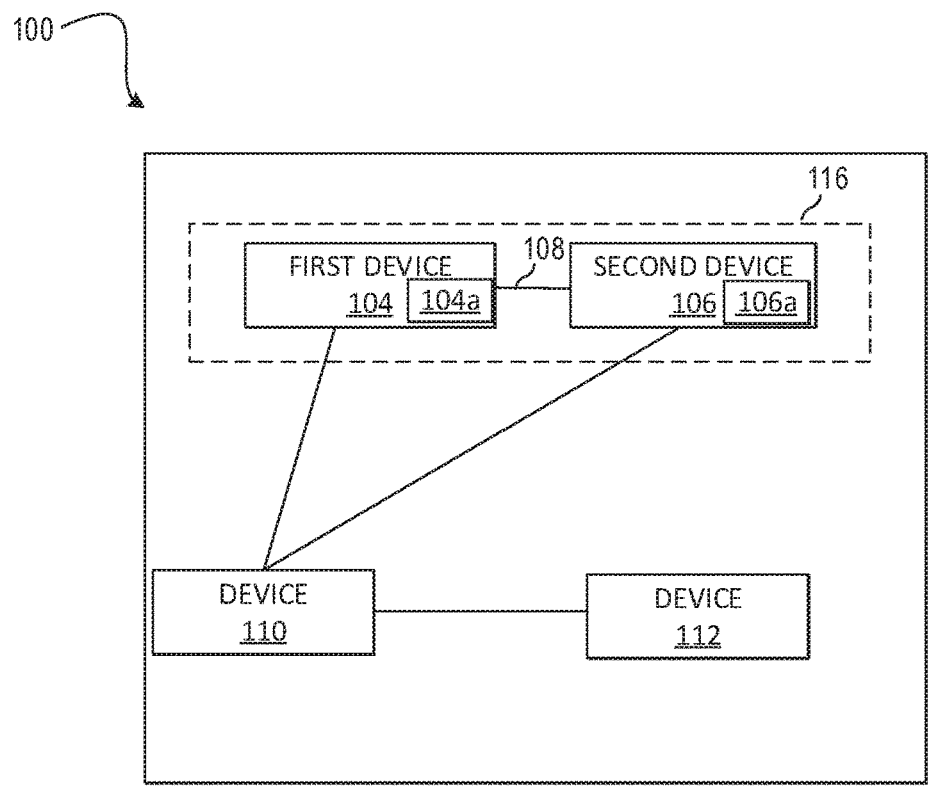
FIG. 1A is a block diagram of an example system for using labels in a virtualized switch environment.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Multiprotocol Label Switching (MPLS) is a networking technique where data is directed from one node to the next based on short path labels instead of traditional network addresses. A label may be, for example, an identifier with some local significance. In conventional IP networking, as a packet of a connectionless network layer protocol travels from one router to the next, each router makes an independent forwarding decision for that packet. A first function may partition the entire set of possible packets into a set of "Forwarding Equivalence Classes (FECs)" or Route prefixes. A second function may map each FEC to a next hop. In MPLS, the assignment of a particular packet to a particular FEC is done just once, as the packet enters the network. The FEC to which the packet is assigned is encoded as a short fixed length value known as a "label". When a packet is forwarded to its next hop, the label is sent along with it. That is, the packets are "labeled" before they are forwarded. At subsequent hops, there is no further analysis of the packet's network layer header. Rather, the label is used as an index into a table which specifies the next hop, and a new label. The old label is replaced with the new label, and the packet is forwarded to its next hop.

Link aggregation (LAG) is point-to-point link between a pair of network devices. Traffic may get load balanced among interfaces of the LAG, in order to help increase the aggregate bandwidth and improve link failure recovery. Multi-Chassis Link Aggregation Group (MCLAG) is a type of LAG with constituent ports that terminate on separate chassis, primarily for the purpose of providing redundancy in the event one of the chassis fails, MCLAG may be used to create a virtual environment when a LAG is created between a pair of two network devices, such as network switches.

An MCLAG environment may include at least two aggregated network devices (M1 and M2) and a third device in communication with the aggregated network devices (R1). An MCLAG may use an active forwarding mode where each device in the pair can do Layer 3 forwarding on behalf of the other device. If a packet which has to be routed by M2 has reached M1, then M1 will route the packet on behalf of M2 and vice versa.

When MPLS is used in an MCLAG with an active-active forwarding mode, then forwarding may become a problem. Labels are allocated by the downstream device, so incoming labels generated by MCLAG devices could be different for the same FEC (Route prefix). R1 has a lag to both M1 and M2 and the MPLS packets send over the Lag from R1 can land on either M1 or M2. But the same MPLS label may have different meaning on M1 and M2. So the packet may get wrongly forwarded depending on whether it has reached M1 or M2.

This is because the Incoming Label Map which is used for MPLS forwarding may be different in M1 and M2. Accordingly, M1 may misinterpret the incoming labels of M2 and vice versa. For example, incoming label 20 might be bounded with Route Prefix 10.0.0.0/8 in M1 and the same label would be bounded to Prefix 20.0.0.0/8 in M2.

Aspects of the systems and methods described herein address this problem by have MCLAG peers allocate labels by coordinating with each other, There would be a hand shake between M1 and M2 before a label for a corresponding prefix is allocated.

A method for using labels in a virtualized switch environment may include receiving, at a first label manager of a first network device, a first request to allocate a first label for a first route prefix for a first protocol, wherein the first network device and a second network device are part of a virtualized network device. The method may include receiving, at a second label manager of the second network device, a second request to determine the first label for the first route prefix for the first protocol, wherein the second request originates from the first label manager and determining, at the second label manager, the first label for the first route prefix for the first protocol. The method may include transmitting, the first label to the first label manager and transmitting, by the first label manager, the first label to a label management protocol corresponding to the first protocol, in response to the first request.

FIG. 1A is a block diagram of an example system 100 where using labels in a virtualized device environment may be useful.

The system 100 may include a first network device 104 and a second network device 106 connected by a link 108. The link 108 may be used to create a virtualized network device environment between the two devices. In one aspect, the link 108 may be part of an MCLAG topology. The system may also include a third network device 110 and a fourth network device 112.

Network devices 110-112 may be any number of network devices, as described above. For example, devices 110-112 may be network switches. A network device may be a device within a network that forwards data sent by a sender device toward a recipient device (or multiple recipient devices).

As described above, one or more of the network devices may communicate using a MPLS scheme where data is directed from one node to the next based on short path labels corresponding to FECs. A label may be, for example, an identifier with some local significance.

A packet may be assigned to a FEC based (completely or partially) on its network layer destination address. In MPLS, the assignment of a particular packet to a particular FEC is done just once, as the packet enters the network. The label value does not necessarily represent the FEC for any packets other than those which are being sent from the first device to the second device. Instead, the label is typically an arbitrary value selected by the down stream device for the up stream device.

When using MPLS, the IP header is not looked while forwarding the packets based on MPLS labels. Labels are learnt for the Route prefixes using a label allocation protocol like Label Distribution Protocol (LDP), Resource Reservation Protocol (RSVP), Border Gateway Protocol (BGP), etc. The local label may be allocated by the network device itself and is distributed to other upstream label protocol peers.

If a network device determines that a packer is a MPLS packet, such as by looking for a MPLS tag, the network device looks at an Incoming Label Map (ILM). The ILM contains the incoming labels, and it points to NHLFE (Next Hop Label Forwarding Entry) which will have information on how to forward the packet (operation to be performed, out-going label, etc.).

If two devices, such as, for example virtual device 116 and device 110) are Label Switching Router (LSRs), they may agree that when the first device transmits a packet to the second device, the first device will label with packet with label value if and only if the packet is a member of a particular FEC. That is, they can agree to a "binding" between the label value and the FEC.

A "packet" or "data packet" can refer to any unit of data that can be conveyed over a network. A packet or data packet may also refer to a frame or data frame, a data unit, a protocol data unit, and so forth.

The first network device 104 may be communicatively coupled to each of the network devices 110-112. Similarly, the second network device 106 may be communicatively coupled to each of the network devices 110-112. Link 108 and the various connections between first network device 104, the second network device 106 and the network devices 110-112 may be a physical link, such as an Ethernet connection or other physical connection, a wireless connection, a virtual connection, etc.

The combination of the first network device 104 and the second network device 106 may be presented to the user as a single virtualized network device 116. One of the network devices may be a primary network device and the other network device may be a peer device. In the event that the first network device 104 goes down, no traffic may be lost, although the total amount of bandwidth available to the system may be reduced. Moreover, this architecture provides the ability to configure one network device 104 and have the configuration synced to the network device 106. This keeps the network facing elements consistent across management changes to allow for load balancing and high availability in case of failure.

Moreover, the virtualization of the first network device 104 and the second network device 106 as a single virtualized device 116 may allow an LACP (Link Aggregation Control Protocol) group to span more than one network device. In MCLAG (Multi Chassis LAG) based virtualized deployments there are two independent control planes. If the MCLAG pair is connected-up a primary device via an MCLAG with any routing protocol running on top, the network devices may sync their Router-MAC entries between the devices involved so that data traffic can be directly forwarded without sending over an Inter-Switch Link (ISL).

A virtualized network device environment may use an active forwarding mode. In an active forwarding mode, some or all data packets received at one network device in the environment may be routed to other network devices in the environment. A non-virtualized network device (such as device 110 and/or 112) has a lag to both devices part of the virtualized network device (first device 104 and second device 106) and the MPLS packets sent over the lag from the non-virtualized network device can land on either the first device 104 or second device 106. But the same MPLS label may have different meaning on the first device 104 and the second device 106. So, the packet may get wrongly forwarded.

System 100 may implement a label manager to address this problem. A label manager may be a software module that manages label allocation for a network device. Each network device in the virtualized network switch may have a label manager, but there may be a primary label manager for the entire virtualized network switch. Accordingly, all label allocation will go through the primary label manager, ensuring that the label allocations are consistent between devices in the virtualized network switch. In other words, label management protocols run independently on each device that is part of the virtualized network device (first device 104 and second device 106), but label allocation for a route prefix will be always done by the primary label manager.

Any label manager can be used as the primary label manager, as long as all devices that are part of the virtualized network switch recognize the same label manager as the primary label manager.

In some aspects, for example, the label manager of the primary network device in the virtualized network device may be the primary label manager. For example, in system 100, first device 104 is the primary device and second device 106 is the secondary device. Accordingly, a label manager 104a of first device 104 may be the primary label manager and label manager 106a of second device 106, may be a normal label manager.

When a new label has to be generated by a label management protocol in the first device 104, the primary label manager 104a can allocate locally without consulting the second device 106 and/or the label manager 106a. There could be multiple label management protocols running—LOP, RSVP or BGP or any other protocol. Label allocation would be queried for a route prefix and/or for all routes.

When a new label has to be generated by a label management protocol in second device 106, the label management protocol queries the label manager 106a. The label manager 106a will communicate with the primary label manager 104a in the first device 104 to get the FEC binding. The communication may be done over the ISL link (such as link 108 in FIG. 1A) using. If a label binding for that FEC/Prefix already exists in the primary label manager 104a, then that will be sent to label manager 106a. If not, a new label binding will be allocated and sent to label manager 106a.

Figure 1B:
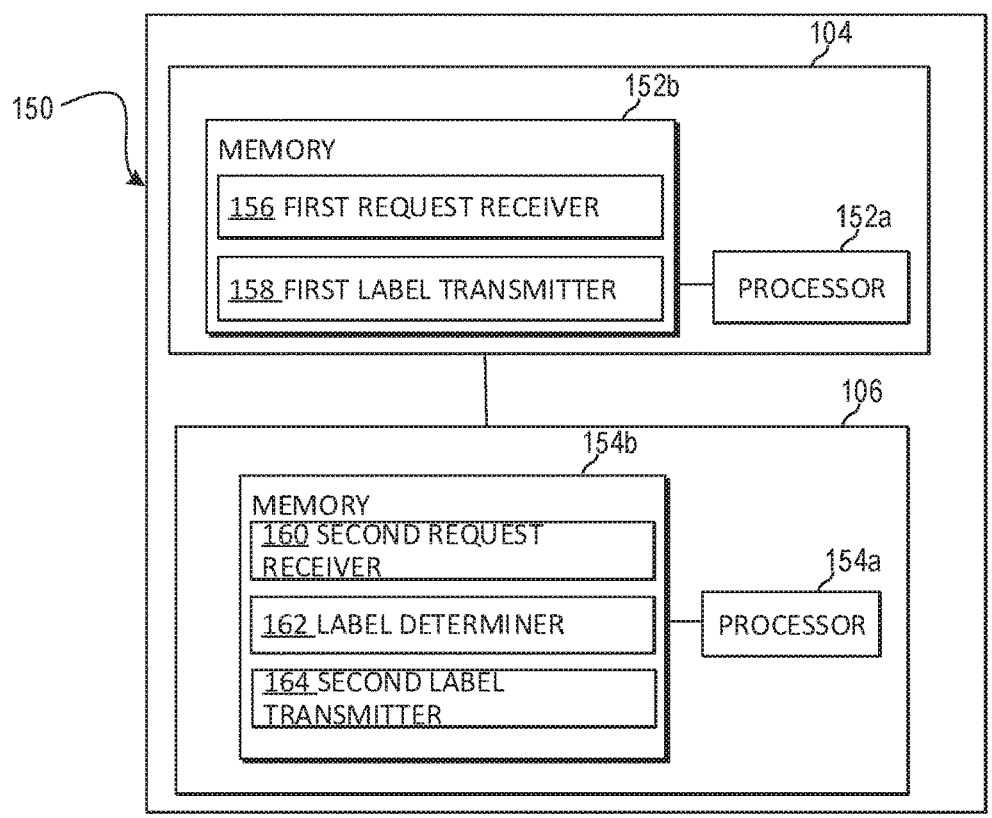
FIG. 1B is a block diagram of another example system for using labels packets in a virtualized switch environment.

FIG. 1B is a block diagram of another example system 150 for using labels in a virtualized device environment. Each network device in the virtualized environment may be configured to actively manage a network and/or to appear as a single virtual device in a management pane.

System 150 may include a first device 104 with a processor 152a and a memory 154b that may be coupled to each other through a communication link (e.g., a bus). System 150 may also include a second device 106 with a processor 154a and a memory 154b, Processor 152a and 154a may include a single or multiple Central Processing Units (CPU) or another suitable hardware processor(s). In some examples, memory 152b and 154b store machine readable instructions executed by processor 152a and 154a, respectively, for system 150. Memory 152b and 152b may include any suitable combination of volatile and/or non-volatile memory, such as combinations of Random Access Memory (RAM), Read-Only Memory (ROM), flash memory, and/or other suitable memory.

Memory 152a stores instructions to be executed by processor 152a including instructions for first request receiver 156, first label transmitter 158 and/or other components. Memory 154b stores instructions to be executed by processor 154a including instructions for second request receiver 160, label determiner 162, second label transmitter 164 and/or other components. According to various implementations, system 150 may be implemented in hardware and/or a combination of hardware and programming that configures hardware. Furthermore, in FIG. 1B and other Figures described herein, different numbers of components or entities than depicted may be used.

Processor 152a may execute first request receiver 156 to receive a first request to allocate a first label for a first route prefix for a first protocol. The first network device and the second network device may be part of a virtualized network device. Processor 152a may execute first label transmitter 158 to receive a second request to determine the first label for the first route prefix for the first protocol.

Processor 152b may execute second request receiver 160 to determine the first label for the first route prefix for the first protocol. Processor 152b may execute label determiner 162 to transmit the first label to the first label manager. Processor 152b may execute second label transmitter 164 to transmit the first label to a label management protocol corresponding to the first protocol, in response to the first request.

Figure 2:
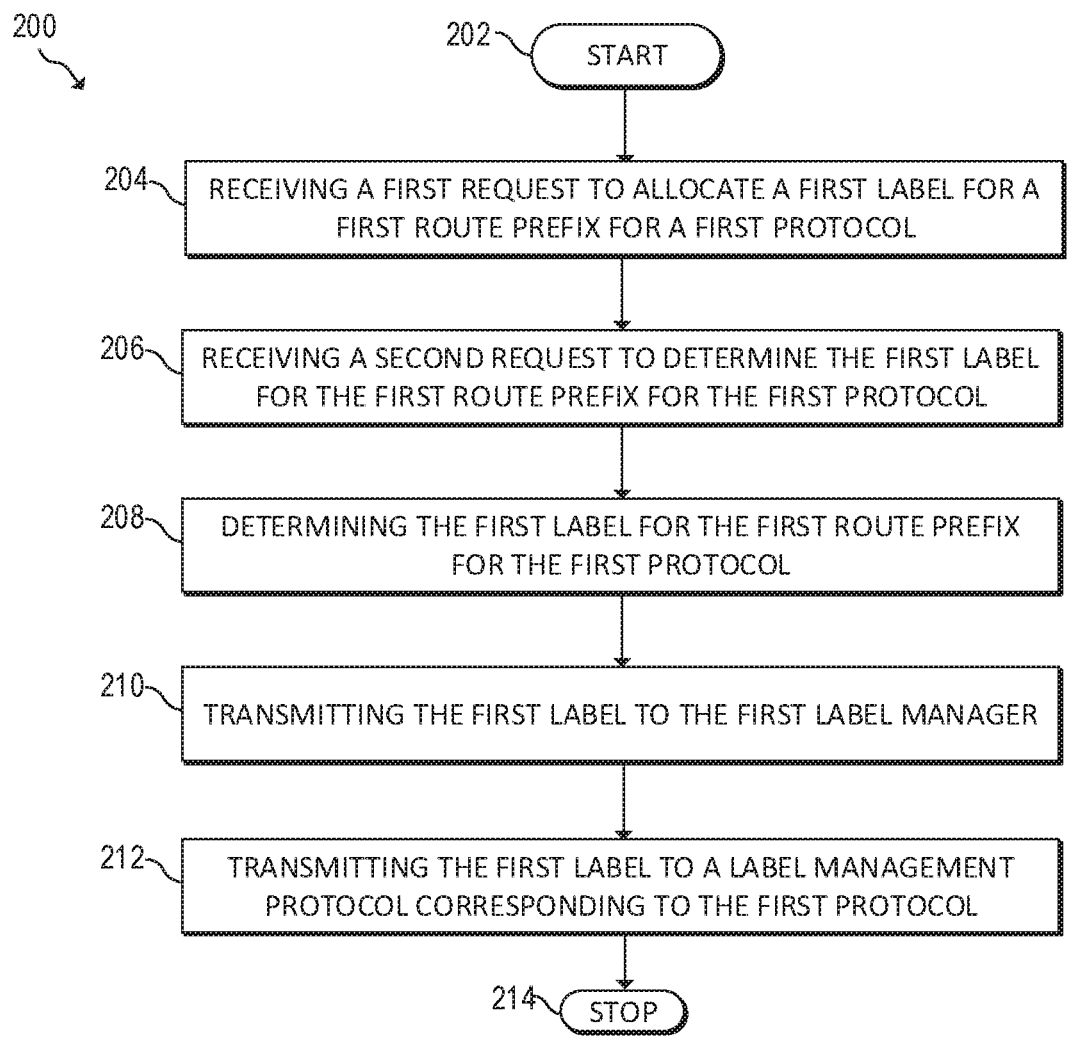
FIG. 2 is a flow diagram of an example method for using labels in a virtualized switch environment.

FIG. 2 is a flow diagram of a method 200 for using labels in a virtualized device environment. The virtualized device deployment may have a similar topology to system 100 described above. Accordingly, parts of and/or the entire method may be performed by one or more of the devices 104, 106, 110 and 112 of system 100. Although the description of FIG. 2 may refer to system 100 and other elements of FIG. 1A, this is for illustrative purposes only and the method described in FIG. 2 may be used in a variety of topologies.

The method may begin at block 202 and proceed to block 204 where the method may include receiving, at a first label manager of a first network device, a first request to allocate a first label for a first route prefix for a first protocol. The first network device and a second network device may be part of a virtualized network device. The first network device may be a secondary network device of the virtualized network device and the second network device may be a primary network device of the virtualized network device. The virtualized network device may be in an active active forwarding mode and both the first network device and the second network device may be able to forward network data on behalf of the other.

At block 206, the method may include receiving, at a second label manager of the second network device, a second request to determine the first label for the first route prefix for the first protocol. The second request may originate from the first label manager. The second request may be transmitted from the first network device to the second network device over an inter-switch link between the two devices. At block 208, the method may include determining, at the second label manager, the first label for the first route prefix for the first protocol. At block 210, the method may include transmitting the first label to the first label manager.

At block 212, the method may include transmitting, by the first label manager, the first label to a label management protocol corresponding to the first protocol, in response to the first request. The first label may be included in a label portion of a packet header of a network data packet. The method may proceed to block 214, where the method may end.

Figure 3A:
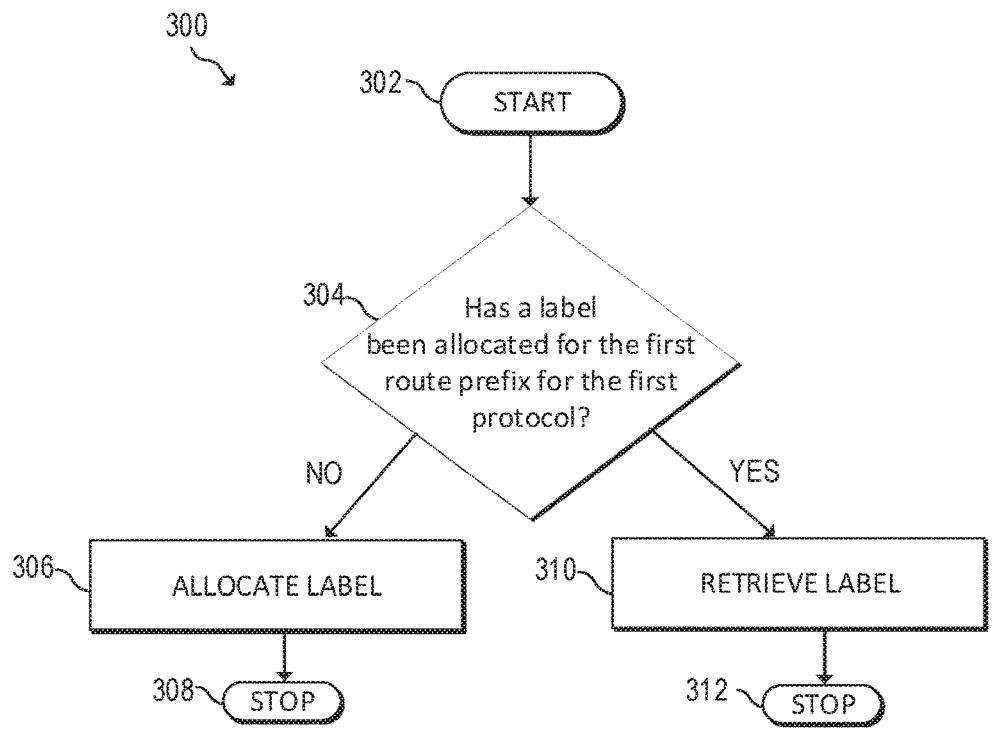
FIG. 3A is a block diagram of an example method for allocating labels.
Figure 3B:
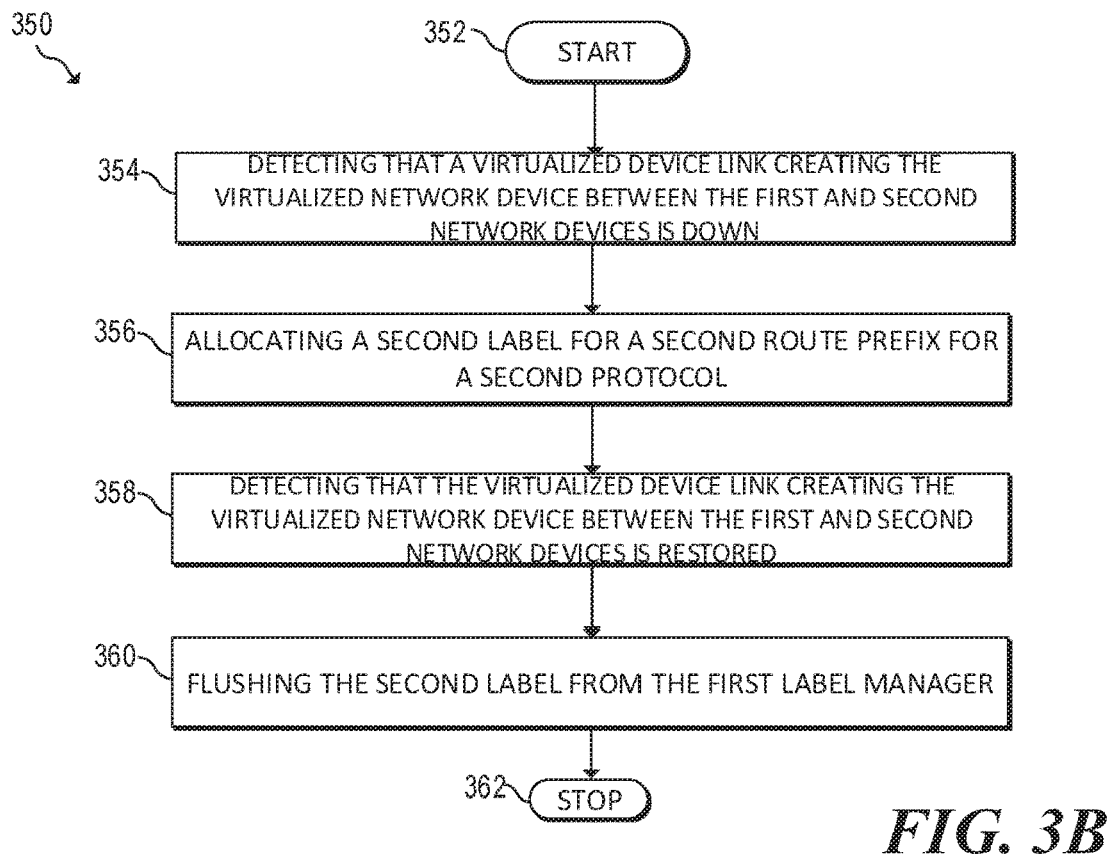
FIG. 3B is a block diagram of another example method for allocating labels.

FIGS. 3A and 3B are flow diagrams of methods for allocating labels in a virtualized device environment. The virtualized device deployment may have a similar topology to system 100 described above. Accordingly, parts of and/or the entire method may be performed by one or more of the devices 104, 106, 110 and 112 of system 100. Although the description of FIGS. 3A-B may refer to system 100 and other elements of FIG. 1A, this is for illustrative purposes only and the method described in FIGS. 3A-B may be used in a variety of topologies.

In some aspects, there may be a split in the virtualized network device (such as device 116 in FIG. 1A) and the link (such as link 108) between the devices (such as first device 104 and second device 106) in the virtualized network device may become inactive. Accordingly, each device that was formerly part of the virtualized network device will start acting as a non-virtualized device and start allocating labels locally. When the link is restored and each device becomes part of the virtualized network device again, the labels will be flushed and re-acquired. Accordingly, method 300 may be performed by each device formerly part of a virtualized network device, such as first device 104 and second device 106, after the link between them is severed.

Method 300 may begin at block 302 and may proceed to block 304 where the method may include determining whether a label has been allocated for a first route prefix for a first protocol. If it is determined that a label has not been allocated for the first route prefix for the first protocol (NO branch of block 304), then the method may proceed to block 306, where the method may include allocating a label for the first route prefix for the first protocol. The method may proceed to block 308, where the method may end.

If it is determined that a label has been allocated (YES branch of block 304), then the method may proceed to block 310, where the method may include retrieving the label. The method may proceed to block 312, where the method may end.

Method 350 may begin at block 352 and proceed to block 354, where the method may include determining, at the second label manger, whether a label has been allocated for the first route prefix for the first protocol. At block 356, the method may include allocating a second label for a second route prefix for a second protocol and at block 358, the method may include detecting, at the first network device, that the virtualized device link creating the virtualized network device between the first and second network devices is restored. At block 360, the method may include flushing, the second label from the first label manager. The method may proceed to block 362, where the method may end.

Figure 4:
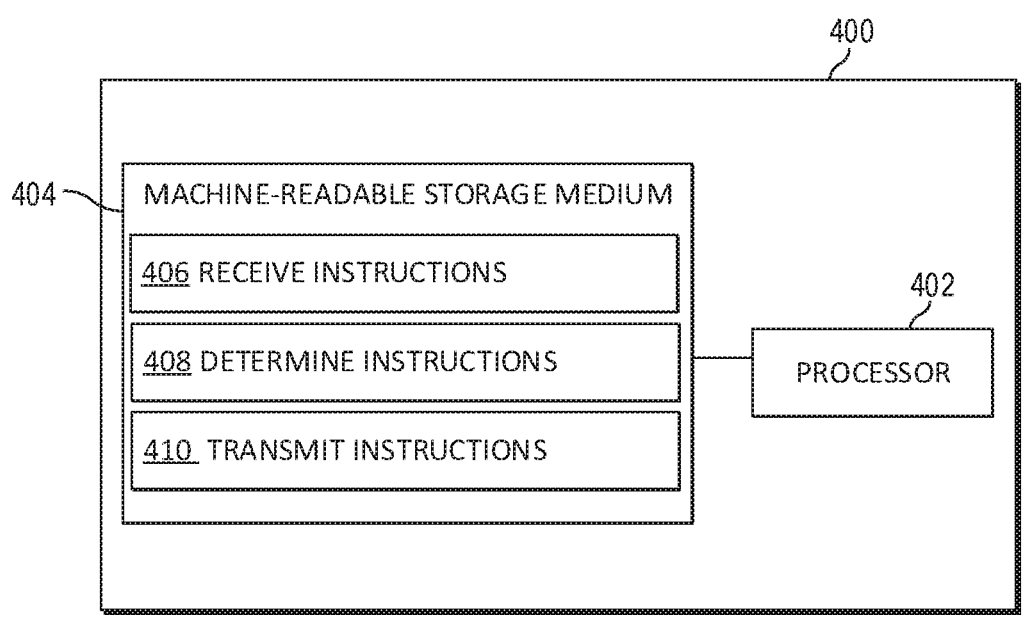
FIG. 4 is a block diagram of an example storage medium storing machine-readable instructions for using labels in a virtualized switch environment.

FIG. 4 is a block diagram of an example system 400 for using labels in a virtualized device environment. Both the first and second network devices may be configured to actively manage a network and/or to appear as a single virtual device in a management pane.

In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408 and 410. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, receive instructions 406, when executed by a processor (e.g., 402), may cause system 400 to receive, at a second label manager of a second network device, a request to determine a first label for a first route prefix for a first protocol. The request may originate from a first label manager of a first network device and the first network device and a second network device are part of a virtualized network device. The first network device may be a secondary network device of the virtualized network device and the second network device may be a primary network device of the virtualized network device. The virtualized network device may be in an active active forwarding mode and both the first network device and the second network device can forward network data on behalf of the other. The request may be transmitted over an inter-switch link between the two devices.

Determine instructions 406, when executed by a processor (e.g., 402), may cause system 400 to determine, at the second label manager, the first label for the first route prefix for the first protocol. Transmit instructions 406, when executed by a processor (e.g., 402), may cause system 400 to transmit, the first label to the first label manager for inclusion in a label portion of a packet header of a network data packet. The first label is included in a label portion of a packet header of a network data packet.

System 500 may include a processor 502 and a memory 504 that may be coupled to each other through a communication link (e.g., a bus). Processor 502 may include a single or multiple Central Processing Units (CPU) or another suitable hardware processor(s). In some examples, memory 504 stores machine readable instructions executed by processor 502 for system 500. Memory 504 may include any suitable combination of volatile and/or non-volatile memory, such as combinations of Random Access Memory (RAM), Read-Only Memory (ROM), flash memory, and/or other suitable memory.

Figure 5:
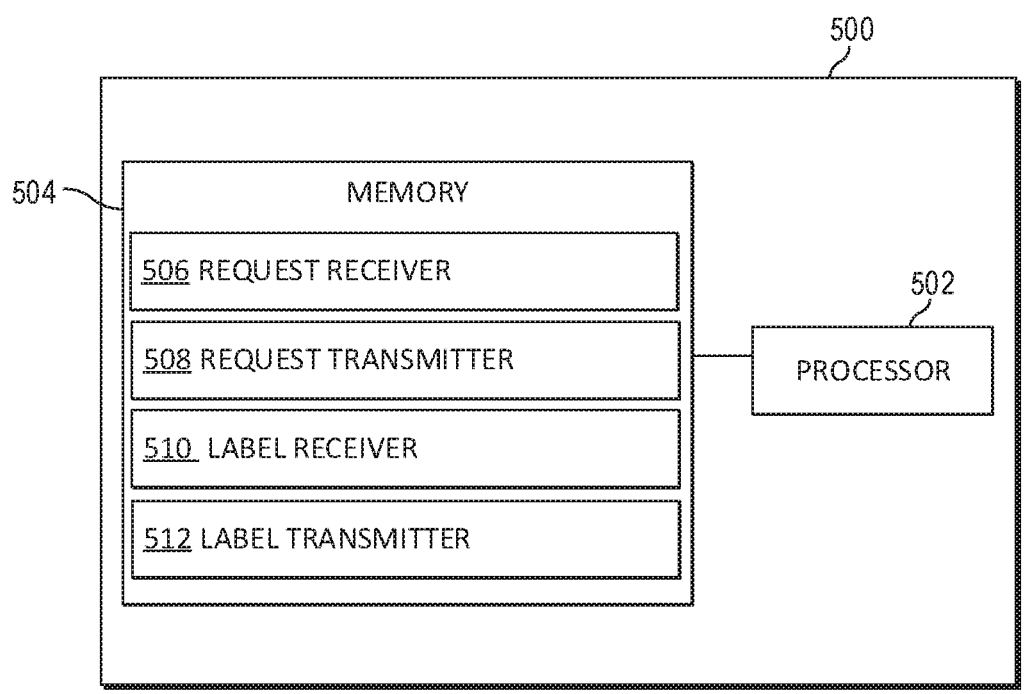
FIG. 5 is a block diagram of another example system for using labels packets in a virtualized switch environment Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Memory 504 stores instructions to be executed by processor 502 including instructions for request receiver 506, request transmitter 508, label receiver 510, label transmitter 512 and/or other components. According to various implementations, system 500 may be implemented in hardware and/or a combination of hardware and programming that configures hardware. Furthermore, in FIG. 5 and other Figures described herein, different numbers of components or entities than depicted may be used.

Processor 502 may execute request receiver 506 to receive, at a first label manager of a first network device, a first request to allocate a first label for a first route prefix for a first protocol. The first network device and a second network device may be part of a virtualized network device. The first network device may be a secondary network device of the virtualized network device and the second network device may be a primary network device of the virtualized network device. The virtualized network device may be in an active active forwarding mode and both the first network device and the second network device can forward network data on behalf of the other.

Processor 502 may execute request transmitter 508 to transmit, from the first label manager, a second request to determine the first label for the first route prefix for the first protocol. The second request originates from the first label manager. The request transmitter may transmit the second request from the first network device to the second network device over an inter-switch link between the two devices.

Processor 502 may execute label receiver 510 to receive, from the second label manager, the first label for the first route prefix for the first protocol. Processor 502 may execute label transmitter 512 to transmit, by the first label manager, the first label to a label management protocol corresponding to the first protocol, in response to the first request. In some aspects, system 500 may also include a packet handler to include the first label in a label portion of a packet header of a network data packet.

The foregoing disclosure describes a number of examples for using labels in a virtualized device environment. The disclosed examples may include systems, devices, computer-readable storage media, and methods for using labels in a virtualized device environment. For purposes of explanation, certain examples are described with reference to the components illustrated in FIGS. 1A-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

We claim:

1. A method comprising:
receiving, at a first label manager of a first network device, a first request to allocate a first label for a first route prefix for a first protocol, wherein the first network device and a second network device are part of a virtualized network device;
receiving, at a second label manager of the second network device, a second request to determine the first label for the first route prefix for the first protocol, wherein the second request originates from the first label manager;
determining, at the second label manager, the first label for the first route prefix for the first protocol;
transmitting, the first label to the first label manager;
transmitting, by the first label manager, the first label to a label management protocol corresponding to the first protocol, in response to the first request,
detecting, at the first network device, that a virtualized device link creating the virtualized network device between the first and second network devices is down;
allocating a second label for a second route prefix for a second protocol;
detecting, at the first network device, that the virtualized device link creating the virtualized network device between the first and second network devices is restored; and
flushing, the second label from the first label manager.

2. The method of claim 1 comprising:
transmitting the second request from the first network device to the second network device over an inter-switch link between the two devices.

3. The method of claim 1 comprising:
determining, at the second label manger, whether a label has been allocated for the first route prefix for the first protocol;
wherein if it is determined that the label has not been allocated for the first route prefix for the first protocol, allocating the first label,
wherein if it is determined that the label has been allocated for the first route prefix for the first protocol, retrieving the first label.

4. The method of claim 1, wherein the first network device is a secondary network device of the virtualized network device and the second network device is a primary network device of the virtualized network device.

5. The method of claim 1, wherein the virtualized network device is in an active active forwarding mode and both the first network device and the second network device can forward network data on behalf of the other.

6. The method of claim 1 comprising:
including the first label in a label portion of a packet header of a network data packet.

7. A non-transitory computer-readable storage medium encoded with instructions, the instructions executable by a processor of a system to cause the system to:
receive, at a second label manager of a second network device, a request to determine a first label for a first route prefix for a first protocol, wherein the request originates from a first label manager of a first network device and the first network device and a second network device are part of a virtualized network device;
determine, at the second label manager, the first label for the first route prefix for the first protocol;
transmit, the first label to the first label manager for inclusion in a label portion of a packet header of a network data packet,
detect, at the first network device, that a virtualized device link creating the virtualized network device between the first and second network devices is down;
allocate a second label for a second route prefix for a second protocol;
detect, at the first network device, that the virtualized device link creating the virtualized network device between the first and second network devices is restored; and
flush, the second label from the first label manager.

8. The non-transitory computer-readable storage medium of claim 7, wherein the virtualized network device is in an active active forwarding mode and both the first network device and the second network device can forward network data on behalf of the other.

9. The non-transitory computer-readable storage medium of claim 7, wherein the instructions executable by the processor cause the system to:
determine, at the second label manger, whether a label has been allocated for the first route prefix for the first protocol;
wherein if it is determined that the label has not been allocated for the first route prefix for the first protocol, allocate the first label,
wherein if it is determined that the label has been allocated for the first route prefix for the first protocol, retrieve the first label.

10. The non-transitory computer-readable storage medium of claim 7, wherein the instructions executable by the processor cause the system to:
transmit the second request from the first network device to the second network device over an inter-switch link between the two devices.

11. The non-transitory computer-readable storage medium of claim 7, wherein the first network device is a secondary network device of the virtualized network device and the second network device is a primary network device of the virtualized network device.

12. The non-transitory computer-readable storage medium of claim 7, wherein the first label is included in a label portion of a packet header of a network data packet.

13. A system comprising:
a request receiver to receive, at a first label manager of a first network device, a first request to allocate a first label for a first route prefix for a first protocol, wherein the first network device and a second network device are part of a virtualized network device;

a request transmitter to transmit, from the first label manager, a second request to determine the first label for the first route prefix for the first protocol, wherein the second request originates from the first label manager;

a label receiver to receive, from the second label manager, the first label for the first route prefix for the first protocol;

a label transmitter to transmit, by the first label manager, the first label to a label management protocol corresponding to the first protocol, in response to the first request, a link detector to:
  detect, at the first network device, that a virtualized device link creating the virtualized network device between the first and second network devices is down;
  allocate a second label for a second route prefix for a second protocol;
  detect, at the first network device, that the virtualized device link creating the virtualized network device between the first and second network devices is restored; and
  flush, the second label from the first label manager.

14. The system of claim 13 comprising:
the request transmitter to transmit the second request from the first network device to the second network device over an inter-switch link between the two devices.

15. The system of claim 13, wherein the first network device is a secondary network device of the virtualized network device and the second network device is a primary network device of the virtualized network device.

16. The system of claim 13, wherein the virtualized network device is in an active active forwarding mode and both the first network device and the second network device can forward network data on behalf of the other.

17. The system of claim 13 comprising:
a packet handler to include the first label in a label portion of a packet header of a network data packet.

* * * * *